US012322406B1

(12) United States Patent
Wang et al.

(10) Patent No.: US 12,322,406 B1
(45) Date of Patent: Jun. 3, 2025

(54) METHOD AND SYSTEM FOR NOISE REDUCTION IN AIRCRAFT SIMULATOR SOUNDS, DEVICE, AND MEDIUM

(71) Applicant: Beihang University, Beijing (CN)

(72) Inventors: Lijing Wang, Beijing (CN); Runhao Li, Beijing (CN); Xiaolong Wang, Beijing (CN); Yanzeng Zhao, Beijing (CN); Haixin Xu, Beijing (CN); Tianyang Cai, Beijing (CN); Yunan Zou, Beijing (CN); Jun Zhang, Beijing (CN); Jiaying Zou, Beijing (CN)

(73) Assignee: Beihang University, Beijing (CN)

( * ) Notice: Subject to any disclaimer, the term of this patent is extended or adjusted under 35 U.S.C. 154(b) by 0 days.

(21) Appl. No.: 18/947,651

(22) Filed: Nov. 14, 2024

(30) Foreign Application Priority Data

Mar. 26, 2024 (CN) ......................... 202410345666.4

(51) Int. Cl.
*H04B 15/00* (2006.01)
*G10L 21/0208* (2013.01)
*G10L 25/30* (2013.01)

(52) U.S. Cl.
CPC .......... *G10L 21/0208* (2013.01); *G10L 25/30* (2013.01)

(58) Field of Classification Search
CPC . G10L 21/0216; G10L 25/30; G10L 21/0208; H04R 3/04
USPC ........................................................ 381/94.1
See application file for complete search history.

(56) References Cited

U.S. PATENT DOCUMENTS

2023/0080298 A1* 3/2023 Yu ............................ H04R 3/04 381/94.1
2024/0284100 A1* 8/2024 Shu ..................... G10L 21/0216

FOREIGN PATENT DOCUMENTS

CN 113129919 A * 7/2021
WO WO-2024176827 A1 * 8/2024

OTHER PUBLICATIONS

Chonglin et al: "Aviation Industry Standards of the People's Republic of China Design and Performance Data Requirements for Flight Simulators—Sound and Vibration Systems", China Aviation Industry Corporation, Oct. 1, 1997.
Anonymous: "Rules for Management and Operation of Flight Simulation Training Devices", Ministry of Transport, Jul. 31, 2019.

* cited by examiner

*Primary Examiner* — Md S Elahee
(74) *Attorney, Agent, or Firm* — WCF IP

(57) ABSTRACT

This application relates to the field of audio noise reduction, and provides a method and system for noise reduction in aircraft simulator sounds, a device, and a medium. The method includes: acquiring sound data from an aircraft simulator sound system; classifying the sound data to obtain classified audio data; performing Short-Time Fourier Transform (STFT) processing on the classified audio data to obtain spectral frames; performing noise reduction processing on the spectral frames by using a neural network, to obtain processed spectral frames, where the neural network includes a recurrent neural network and a Deep Q-network (DQN); and performing inverse STFT on the processed spectral frames to obtain denoised audio. This application can achieve low-cost and efficient noise reduction for sounds.

2 Claims, 3 Drawing Sheets

METHOD AND SYSTEM FOR NOISE REDUCTION IN AIRCRAFT SIMULATOR SOUNDS, DEVICE, AND MEDIUM

CROSS REFERENCE TO RELATED APPLICATION

This patent application claims the benefit and priority of Chinese Patent Application No. 2024103456664, filed with the China National Intellectual Property Administration on Mar. 26, 2024, the disclosure of which is incorporated by reference herein in its entirety as part of the present application.

TECHNICAL FIELD

The present disclosure relates to the field of audio noise reduction, and in particular, to a method and system for noise reduction in aircraft simulator sounds, a device, and a medium.

BACKGROUND

An existing sound noise reduction method based on Short-Time Fourier Transform (STFT) includes setting frequency points for data collection, demodulating and filtering collected data, selecting segment lengths, and performing STFT to obtain power spectral density, comparing resulting data with a threshold, and send processing results to a host computer for playback, thus achieving sound noise reduction more efficiently, reliably, and with higher quality. This method is a typical approach for noise reduction using STFT, which calculates the power spectral density of the data, better reflecting frequency information of sound information, thus allowing for a more accurate distinction between useful information and noise. However, in use of this method, different audio signals with varying lengths, tones, timbres, and noise levels require different parameters such as segment length, threshold, filtering method, Kaiser window, window length, Fast Fourier Transform (FFT) length, and hop length, which can vary significantly. Adjusting these parameters requires multiple subjective listens by the human ear, leading to low efficiency and a time-consuming, cumbersome process in use of this method.

In addition to the aforementioned method, there are various model noise reduction algorithms currently available for noise reduction, most of which utilize a Convolutional Neural Network (CNN) to learn the mapping relationship between input noisy audio and corresponding clean audio. The implementation of model algorithms requires a large amount of paired clean and noisy audio signal model data for training. Typically, this network consists of multiple convolutional layers and pooling layers to extract time-domain and frequency-domain features of the audio. During the training process, the network decomposes and reconstructs the noisy audio by comparing evaluation indicators such as signal-to-noise ratio, speech distortion, and vocal tract distortion between noisy audio and clean audio in the same frequency band, aiming to fit the reconstructed audio signal as closely as possible to the clean audio for model training. Once the model is trained based on a large number of data, it can be used to denoise new noisy audio. This method requires a significant amount of paired noisy and clean audio data for the neural network to learn from. In noise reduction tasks, it is particularly challenging to obtain paired noisy and clean audio data. Additionally, audio data obtained by adding noise to obtained clean audio has limited effectiveness for model training, making it difficult to guarantee the noise reduction effect of this method. Furthermore, when training data is limited, deep learning models are prone to overfitting, and once the environment and data are changed, the results may perform poorly. Lastly, deep learning models typically require substantial computational resources for training and inference, and establishing noise reduction algorithm models demands even more computational resources, leading to high costs. Therefore, there is a need for a low-cost and efficient noise reduction method.

SUMMARY

An objective of the present disclosure is to provide a method and system for noise reduction in aircraft simulator sounds, a device, and a medium, to achieve low-cost and efficient sound noise reduction.

To achieve the above objective, the present disclosure provides the following technical solutions.

A method for noise reduction in aircraft simulator sounds, including: acquiring sound data from an aircraft simulator sound system; classifying the sound data to obtain classified audio data; performing Short-Time Fourier Transform (STFT) processing on the classified audio data to obtain spectral frames; performing noise reduction processing on the spectral frames by using a neural network, to obtain processed spectral frames, where the neural network includes a recurrent neural network and a Deep Q-network (DQN); and performing inverse STFT on the processed spectral frames to obtain denoised audio.

Optionally, said classifying the sound data to obtain the classified audio data specifically includes: classifying the sound data according to recording devices to obtain an initial classification result; performing feature extraction on the initial classification result to obtain feature data; standardizing and normalizing the feature data to obtain standard audio signals; and performing principal component analysis on the standard audio signals to obtain the classified audio data.

Optionally, said performing noise reduction processing on the spectral frames by using the neural network, to obtain the processed spectral frames specifically includes: inputting the spectral frames into the recurrent neural network for time series feature analysis to obtain time series features of the audio data; and inputting the time series features of the audio data into the DQN for noise reduction processing to obtain the processed spectral frames.

The present disclosure further provides a system for noise reduction in aircraft simulator sounds, including: an acquisition module configured to acquire sound data from an aircraft simulator sound system; a classification module configured to classify the sound data to obtain classified audio data; an STFT module configured to perform STFT processing on the classified audio data to obtain spectral frames; a noise reduction module configured to perform noise reduction processing on the spectral frames by using a neural network, to obtain processed spectral frames, where the neural network includes a recurrent neural network and a DQN; and an inverse STFT module configured to perform inverse STFT on the processed spectral frames to obtain denoised audio.

Optionally, the classification module specifically includes: a classification unit configured to classify the sound data according to recording devices to obtain an initial classification result; a feature extraction unit configured to perform feature extraction on the initial classification result to obtain feature data; a standardization and normalization unit configured to standardize and normalize the feature data to obtain standard audio signals; and a principal component analysis unit configured to perform principal component analysis on the standard audio signals to obtain the classified audio data.

Optionally, the noise reduction module specifically includes: a time series feature analysis unit configured to input the spectral frames into the recurrent neural network for time series feature analysis to obtain time series features of the audio data; and a noise reduction unit configured to input the time series features of the audio data into the DQN for noise reduction processing to obtain the processed spectral frames.

The present disclosure further provides an electronic device, including one or more processors; and a storage apparatus storing one or more programs, where the one or more programs, when executed by the one or more processors, cause the one or more processors to implement the method.

The present disclosure further provides a computer storage medium, where the computer storage medium stores a computer program, and the computer program, when executed by a processor, implements the method.

According to specific embodiments of the present disclosure, the present disclosure has the following technical effects:

The method of the present disclosure includes acquiring sound data from an aircraft simulator sound system; classifying the sound data to obtain classified audio data; performing STFT processing on the classified audio data to obtain spectral frames; performing noise reduction processing on the spectral frames by using a neural network, to obtain processed spectral frames, where the neural network includes a recurrent neural network and a DQN; and performing inverse STFT on the processed spectral frames to obtain denoised audio. By combining STFT and neural networks for noise reduction, the present disclosure achieves low-cost and efficient sound noise reduction.

BRIEF DESCRIPTION OF THE DRAWINGS

To describe the technical solutions in embodiments of the present disclosure or in the prior art more clearly, the accompanying drawings required for the embodiments are briefly described below. Apparently, the accompanying drawings in the following description show merely some embodiments of the present disclosure, and those of ordinary skill in the art may still derive other accompanying drawings from these accompanying drawings without creative efforts.

DETAILED DESCRIPTION OF THE EMBODIMENTS

The technical solutions of the embodiments of the present disclosure are clearly and completely described below with reference to the drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

An objective of the present disclosure is to provide a method and system for noise reduction in aircraft simulator sounds, a device, and a medium, to achieve low-cost and efficient sound noise reduction.

In order to make the above objective, features and advantages of the present disclosure clearer and more comprehensible, the present disclosure will be further described in detail below in combination with accompanying drawings and specific embodiments.

Figure 2:
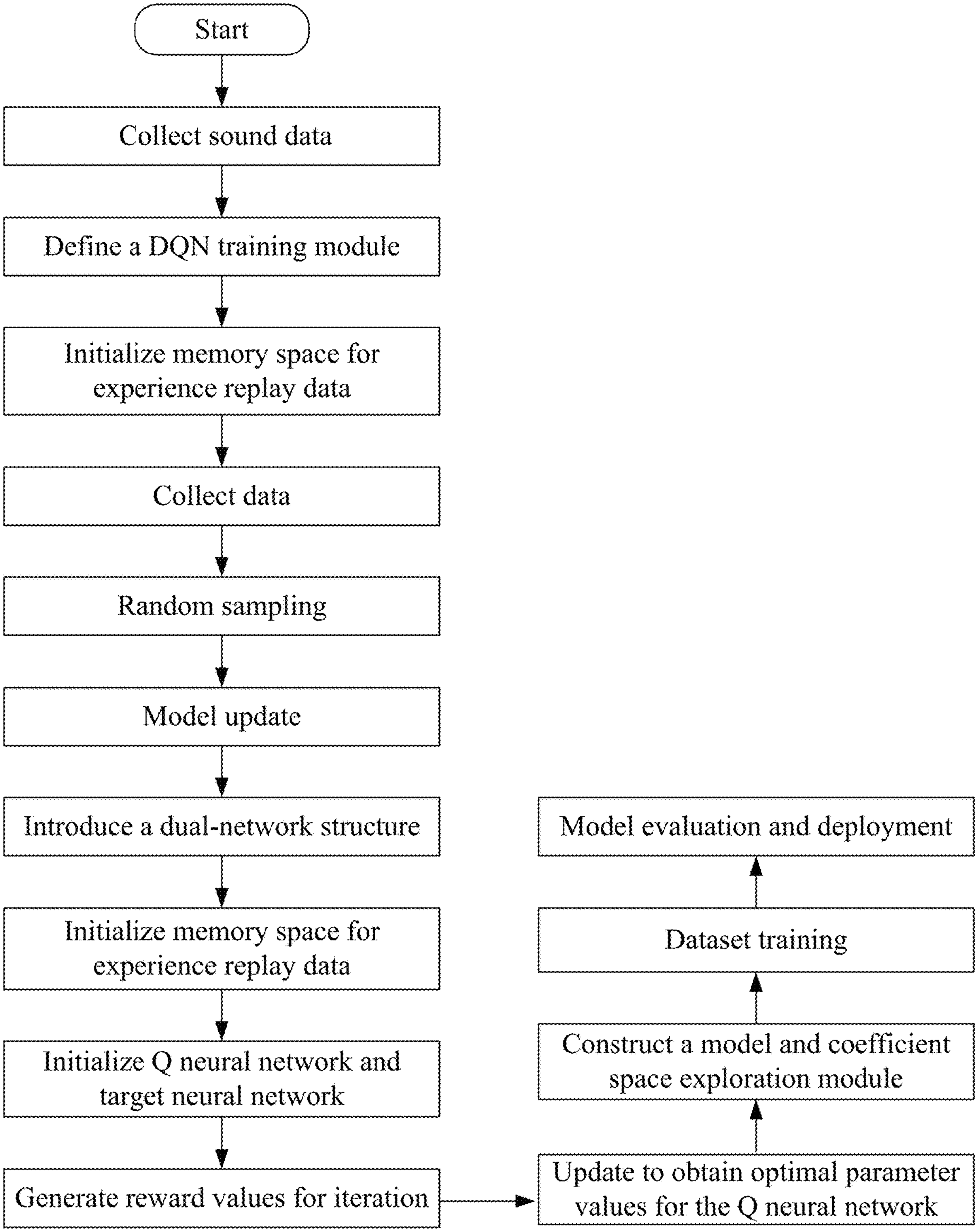
FIG. 2 is flowchart of establishing a sound noise reduction algorithm.
Figure 3:
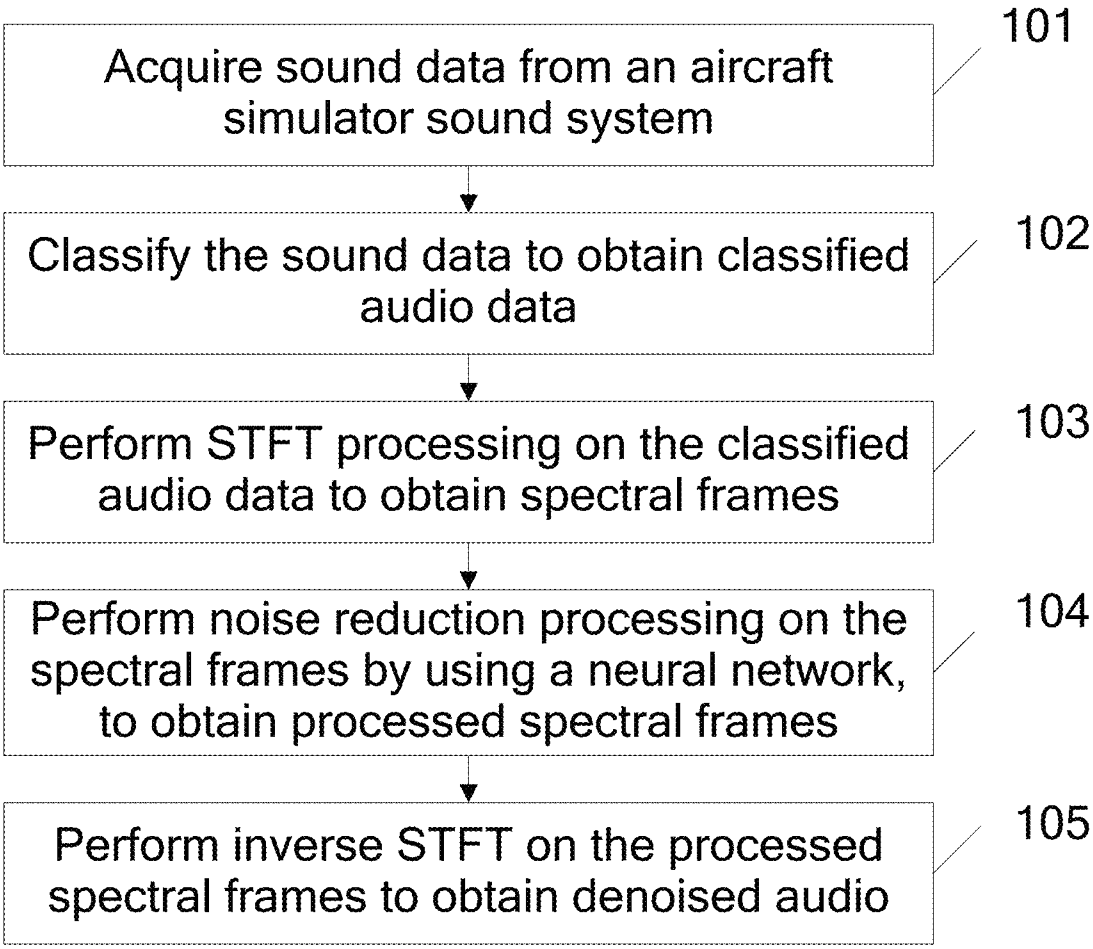
FIG. 3 is a flowchart of a method for noise reduction in aircraft simulator sounds according to the present disclosure.

As shown in FIG. 2 and FIG. 3, the present disclosure provides a method for noise reduction in aircraft simulator sounds, including the following steps:

Step 101: Acquire sound data from an aircraft simulator sound system.

The present disclosure primarily targets the noise reduction process of the sound system inside the aircraft simulator. The first step involves collecting sound data. In a real aircraft cabin, sensors are fixed next to the ear of the pilot to directly capture received sound signals.

The hearing range of the human ear is from 20 Hz to 20 kHz. According to Shannon's sampling theorem, the formula is $Fs \geq 2Fmax$. Fmax represents a highest frequency component in an original signal, and Fs represents a sampling frequency. The higher the sampling frequency, the closer the recovered waveform will be to the original signal. Therefore, when the sampling frequency $Fs \geq 2Fmax$, the original signal can be completely restored. Thus, a sampling frequency of Fs=44.1 Hz, a sampling bit depth of Bit=16 bit, and a mono channel, i.e., channel=1, are selected Additionally, sounds to be collected should comply with the Civil Aviation Administration of China (CAAC) AC-60-01 "Management and Operational Rules for Flight Simulation Training Devices" and HB7504.15 "Data Requirements for Sound and Vibration in Flight Simulator Design and Performance."

Aircrafts produce various sounds during flight. These sounds come from different sources and have distinct characteristics. Understanding the sound sources and characteristics thereof provides strong support for sound recording, analysis, simulation, and playback tasks of a project.

The characteristics of each sound source are as follows:

(1) Powerplant sounds: These are sounds generated by the powerplant of an aircraft during operation, including an engine start sound, a propeller sound, an exhaust sound, a rotor sound, and a beat frequency sound. The powerplant sounds are determined by many factors, such as the type of the aircraft, the rotational speed of the engine rotor, the flight speed of the aircraft, and the flight status.

The engine sound is produced by the rotation of the turbine compressor and turbine fan inside the aircraft engine, typically characterized by a continuous, low-frequency rumble. Therefore, the engine sound is primarily determined by the rotational speed, which affects both the volume and frequency of the engine sound. Additionally, the engine sound is also related to altitude.

(2) Aerodynamic sounds: Theoretically, the outer surface of an aircraft body should be streamlined; however, due to technical reasons, the outer surface of the aircraft body is not completely smooth but divided into various sub-parts, such as the front windshield. Therefore, when the aircraft moves relative to the surrounding air, turbulence occurs at these discontinuities. From an acoustic perspective, these turbulences generate sounds, which seem to originate from the junctions between the windshield and the aircraft body. Theoretically, many factors influence aerodynamic sounds, such as the speed of the aircraft and the flow direction of the airflow relative to the aircraft body, while the airflow direction is also affected by the attitude of the aircraft and potential wind directions. Additionally, the aerodynamic sounds depend on air density, which is related to the altitude and air temperature. In practical simulations, considering all these factors is clearly impractical; thus, based on the actually collected sound data, the focus is primarily on the speed and altitude of the aircraft.

(3) Landing gear sounds: These are sounds produced by the mechanical movement of the landing gear during takeoff and landing, including sounds from the locking, unlocking, landing impact of the landing gear, as well as tire burst sounds. The variation in these sounds is minimal and can be considered unaffected by other factors. These are typically mechanical and continuous sounds that can be heard as the aircraft approaches the ground.

(4) Runway effect sounds: During the takeoff and landing phases, when the aircraft is taxiing on the runway, the tires generate sounds due to friction between the tires and the runway surface, as well as the unevenness of the surface particles. These sounds are primarily related to the relationship between the rotational speed of the tires and the taxiing speed of the aircraft, as well as the contact pressure between the tires and the ground. Additionally, the sounds are also influenced by factors such as the working state of the tires, the braking system, and the landing gear suspension. Finally, the sounds change when there is water, ice, or snow on the runway. In practical simulations, the focus is mainly on the effects of the aircraft speed and runway roughness on tire taxiing sounds.

The tire taxiing sounds are generated due to the friction between the aircraft tires and the ground, including friction sounds and rumbling produced by the main wheels and nose wheel sliding on the ground. The sounds are primarily influenced by the speed of the aircraft.

(5) Atmospheric effect sounds: These include sounds like rain, hail, and thunder. The characteristics of such sounds depend on the physical and meteorological conditions of the atmosphere, with different weather phenomena corresponding to different effect sounds.

(6) Other sounds: These include sounds from aircraft crashes, weapon effects, sounds produced by the gyroscope accelerating after the backup horizon is powered on, as well as sounds from airflow on the windshield and windshield wiper sounds. Most of these sounds are mechanical or electronic, and the specific characteristics of the sound sources depend on the type of equipment and its operating state.

Step 102: Classify the sound data to obtain classified audio data.

Step 102 specifically includes: classifying the sound data according to recording devices to obtain an initial classification result; performing feature extraction on the initial classification result to obtain feature data; standardizing and normalizing the feature data to obtain standard audio signals; and performing principal component analysis on the standard audio signals to obtain the classified audio data.

Corresponding sounds of each component of the aircraft in different flight states are extracted from an immersive environment of a real aircraft cockpit by using recording devices, and are labeled accordingly.

A great variety of sounds are produced during actual flight, making it challenging to simulate and process all types of sounds. During simulation of the sounds of an aircraft in flight, it is theoretically necessary to replicate any possible sound as realistically as possible. However, in practical applications, due to hardware limitations, including CPU and sound card processing capabilities, as well as technical constraints such as sound reflection, reverberation, and obstruction, it is difficult to reproduce original sounds. Therefore, object simplification is necessary. Decisions need to be made based on the importance of the sounds. For example, when multiple sounds are played simultaneously, priority should be given to simulating the sounds that are most perceptible to humans, while secondary or subtle sounds can be omitted. Thus, in collection of sounds for a sound simulation system of a flight simulator, the present disclosure flexibly employs two classification standards to better achieve audio collection and processing, thereby facilitating the establishment of an aircraft simulator audio system. One is classification based on human perception, and the other is classification based on features.

The following are the classifications based on the required controls:

Single play type: This sound is played once without looping and is completed directly, such as the sound of a switch being turned on or off, the locking sound of the landing gear, or tower communications.

Pure loop type: This sound continuously loops with little variation, such as thunderstorm sounds or the operational noise of electronic instruments in the cockpit.

Single loop type: This sound can be distinctly divided into three segments, where the second segment loops after the first segment is finished, followed by the playback of the third segment. This sound can be, for example, an alarm sound.

Volume-modulated loop type: This sound is similar to the loop type but requires changes in volume, such as the sound of wind outside the aircraft, which varies from loud to soft or from soft to loud.

Frequency-modulated loop type: This sound is also similar to the loop type but requires changes in frequency, such as runway effect sounds in some cases.

Volume-and-frequency modulated loop type: The sound needs to change in frequency and amplitude according to flight state parameters, such as the sounds of engine rotors, propellers, intake, and exhaust. This type of sound is prevalent in the flight simulator sound simulation system and is also the primary type for simulation.

Based on the above classification standards, corresponding sounds of each component of the aircraft in different flight states are extracted from the immersive environment of a real aircraft cockpit by using recording devices, and are then labeled and saved in audio file formats such as Waveform Audio File Format (WAV) and Ogg Vorbis (OGG). Feature extraction and feature processing are then performed. Fourier transform is applied to convert the audio signal from the time domain to the frequency domain, extracting spectral features such as spectral centroid, bandwidth, spectral flatness, spectral entropy, and Mel-frequency cepstral coefficients (MFCCs). The feature data of the audio signal undergoes min-max normalization and Z-score standardization to eliminate amplitude differences between different audio samples. For audio signals with excessively high feature dimensions, methods such as Principal Component Analysis (PCA) are used to reduce dimensions while retaining as much important information from the original data as possible. The impact of each feature on classification is analyzed, redundant and irrelevant features are removed, and the most beneficial features for classification are retained. If the sample size of certain categories is significantly larger than others, oversampling or undersampling may be necessary to avoid the model overfitting to a particular category. Ultimately, standardized audio files are obtained for classification.

Step 103: Perform STFT processing on the classified audio data to obtain spectral frames.

Step 104: Perform noise reduction processing on the spectral frames by using a neural network, to obtain processed spectral frames, where the neural network includes a recurrent neural network and a DQN.

Step 104 specifically includes: inputting the spectral frames into the recurrent neural network for time series feature analysis to obtain time series features of the audio data; and inputting the time series features of the audio data into the DQN for noise reduction processing to obtain the processed spectral frames.

The present disclosure employs a Deep Q-Learning algorithm from reinforcement learning, where Q represents a value of an action, and the goal is to find a sequence with a highest cumulative value. A neural network is used to represent a policy function, allowing the policy function to handle more states and actions, resulting in higher reward values based on the actions taken. By replacing a Q-value policy function with a deep neural network, DQN excels at solving sequential decision-making problems, with its output being a complete path with a maximum cumulative value. The path with the maximum cumulative value is not equivalent to always choosing an action with a highest value at each step, as it is possible for the current action to have a high value while subsequent actions on that path have low values, leading to a smaller cumulative value of the actions. DQN can solve path selection problems by choosing a path with a highest cumulative value. Parameters of the neural network are represented as ω, as shown in the following formula:

$$Q(s,\alpha,\omega)=Q^{\pi}(s,\alpha)$$

where s represents a state of an environment, α represents an action taken in state s, and ω represents the parameters of the Q function model, which are typically weights and biases of the neural network in the DQN. Q(s, α, ω) represents a parameterized Q function; $Q^{\pi}$(s, α) represents an optimal Q function, which provides a maximum expected return that can be obtained when the environment is in state s and action a is taken.

In the deep neural network, a mean squared error is used to define a loss function. The loss function L(ω) is as shown in the following formula:

$$L(\omega)=E[(r+\gamma\times\max_{\alpha'}Q(s',\alpha',\omega)-Q(s,\alpha,\omega))^2]$$

where s' represents the next state; a' represents the next action; the current Q value is used to update the target Q value; E represents an expected operator, indicating an average loss function value over all possible state transitions. r represents a reward value, indicating the reward received immediately after an agent performs action α. γ represents a discount factor, used to reduce a present value of future rewards. This value ranges from 0 to 1, representing the importance placed on future rewards.

A vector value of the Q value is updated based on the reward value, as shown in the following formula:

$$Q_n=Q\text{-network}(\alpha_n)+r$$

where Q-network($\alpha_n$) represents a Q value of an n-th action generated by the neural network, r represents a reward value, $Q_n$ represents a Q value of the n-th action after adding the reward value, and the vector of the new Q value is used as a label for the neural network.

The gradient formula is as follows:

$$\frac{\partial L(\omega)}{\partial \omega}=\mathbb{E}\left[2(r+\gamma\max_{a'}Q(s',a',\omega^-)-Q(s,a,\omega))\frac{\partial Q(s,a,\omega)}{\partial \omega}\right]$$

Using the Stochastic Gradient Descent (SGD) method, a random set is drawn from the samples, trained, and then updated according to the gradient. This process is repeated with a new set of samples. In cases where the sample size is extremely large, a model with a loss value within an acceptable range can be obtained without needing to train on all samples. Parameter values of the neural network are updated based on the above gradient, resulting in an optimal Q value.

Initializing memory space for experience replay data: In the present disclosure, during training of the neural network, it is initially assumed that each piece of training data should be independently and identically distributed. However, data generated in the generation process of the gradient formula has strong temporal correlations. If the data generated in the order of the gradient formula is trained sequentially, the correlations of the data will fail to meet the basic conditions of the stochastic gradient descent algorithm, leading to significant oscillations in the loss value of the neural network. By using experience replay, training data can be randomly selected through random sampling, reducing the temporal correlations of the training data, allowing the neural network to store and reuse past data.

Data collection: The "experience replay buffer" is defined as a transition, storing corresponding s, α, r, s' iterated each time passing through an intersection. The replay container is defined as the replay buffer, which stores M transitions. It is defined that if the number of transitions exceeds M, the earliest transition in the container will be deleted. The "container capacity" is defined as buffer capacity, represented by M, which is a hyperparameter set to a large number, typically between $10^5$ and $10^6$.

Random sampling: During model training, a batch of experiences is randomly selected from this buffer. In the present disclosure, the random sampling can be easily achieved using the choice function from the numpy.random package in Python.

Model update: A model ensemble update strategy is adopted, utilizing an existing stacked ensemble strategy mechanism to process prediction results of models. The prediction results of multiple models are provided as an input to another model, referred to as "meta-learner," to generate a final prediction. By using the outputs of the original models as inputs, the meta-learner is trained to optimally combine these inputs. The old models remain unchanged, and the prediction results of the old and new models are fused to obtain randomly sampled experiences. Based on historical performance of the models, an optimal fusion ratio is determined to update weights of the model and thus update the model, thereby maximizing the overall prediction accuracy and reliability. Finally, the performance of the ensemble model is evaluated using a validation set and a test set. This ensures fairness and accuracy in the evaluation.

Introducing a dual network structure: In standard DQN, using a single neural network for training can lead to an overestimation problem. The overestimation problem causes an output of a DQN network to be larger than a true value, making it impossible to select an optimal solution and potentially leading to the selection of a suboptimal solution. The formula for selecting a target network output is as follows:

$$Y_t^{DQN}=r_{t+1}+\gamma\times\max\ Q(s_{t+1},\alpha,\theta_t^-)$$

where $Y_t^{DQN}$ represents the target network output, $r_{t+1}$ represents a reward value at time t+1, $\gamma$ represents a coefficient between 0 and 1, known as a discount factor, used to calculate a present value of future rewards, determining the importance of future rewards in calculating total returns. $\theta_t^-$ represents parameters of the neural network, and $S_{t+1}$ represents a state at time t+1. Since this formula indicates selecting a maximum Q value and maximum reward value among all actions to form the output, the target Q value obtained each time needs to be the maximum value. Each training iteration involves taking a mini-batch for training, where a mini-batch refers to a small batch of samples randomly selected from the entire training dataset. Using mini-batches for training is a compromise between computational efficiency and memory usage, while also helping to improve the generalization ability of the model. During calculation of the loss value, an average value needs to be calculated to update the parameters of the network. Typically, calculating the maximum value among all Q values and then averaging will yield a larger result than averaging first and then finding the maximum value, which can lead to overestimation.

To avoid overestimation, the present disclosure uses two neural networks: one is a Q neural network, and the other is a target neural network. The Q neural network is the main model for noise reduction, responsible for selecting actions and generating policies. It receives an environment state as an input and generates a corresponding action output. Parameters of the Q neural network are continuously updated as training progresses. The target neural network is a copy of the main network, used to calculate target values. Parameters of the target neural network are not updated during training but are periodically copied from the main network. This fixed target network can reduce fluctuations in target values during training and provide a more stable training signal.

The present disclosure uses two neural networks with the same structure in the design of the related DQN algorithm. During the training process, the target network is used to calculate the target Q value and value function, with a certain time delay set for parameter updates, and the output of the target network is compared with the output of the main network to calculate the error. This error is then used to update the parameters of the main network. By alternately updating the main network and the target network, the stability and convergence of the training can be improved, reducing the correlation between the selected Q value and the target Q value, thereby enhancing the stability of the algorithm.

Initializing the Q neural network and target neural network: A reinforcement learning algorithm is introduced, which allows a designated intelligent system to maximize a cumulative reward value of an entire environment during the learning process of an environment-to-action mapping. In the present disclosure, the machine is defined as a noise reduction method operating in an environment E. A state s is defined as a description of the current environment, represented here by time-domain and frequency-domain parameters after noise reduction, where a set of states form a state space S. An action a can cause a transition from the state $s_i$ to the next state $s_{i+1}$. The action here is a short-time Fourier noise reduction operation by modifying parameters. A set of actions form an action space A.

Generating reward values for iteration: Based on the current state and the target neural network, an optimal action is selected. After execution of the action, the state transitions, and a reward value r is obtained. The reward value is related to the corresponding loss function, reflecting that the effectiveness of this iteration is used to evaluate the benefit of the action a selected in the current state s. If it is closer to the target formula, the reward value is positive, and a new formula model is generated and stored in memory. Conversely, the reward value is negative and a new formula model cannot be generated; the process restarts from the initial state.

Updating to obtain optimal parameter values for the Q neural network: The saved training data is randomly selected from the memory space and the Q neural network is trained based on the above method. The loss function is calculated using the formula as follows:

$$L(\omega)=E[(r+\gamma\times\max_{\alpha'}Q(s',\alpha',\omega)-Q(s,\alpha,\omega))^2]$$

and the gradient is calculated using the formula as follows:

$$\frac{\partial L(\omega)}{\partial \omega}=\mathbb{E}\left[2(r+\gamma\max_{a'}Q(s',a',\omega^-)-Q(s,a,\omega))\frac{\partial Q(s,a,\omega)}{\partial \omega}\right].$$

By employing the SGD method, a random set is drawn from the samples, trained, and then updated according to the gradient. This process is repeated with a new set of samples. In cases where the sample size is extremely large, a model with a loss value within an acceptable range can be obtained without needing to train on all samples. Parameter values of the neural network are updated based on the above gradient, resulting in an optimal Q value. Every c steps, the parameter values of the Q neural network are assigned to the target neural network. This process is repeated until an effective neural network is generated.

Using a recurrent neural network (RNN) for feature extraction: First, the classified audio data is input into the recurrent neural network. In this step, the recurrent neural network is responsible for analyzing the temporal characteristics of the audio data, thereby extracting important features for subsequent noise reduction processing. This process produces a set of audio feature data.

Using a DQN for noise reduction processing: The extracted audio feature data is input into the DQN. Here, the DQN utilizes a learned policy to perform noise reduction processing on the audio features. The DQN optimizes its policy through reinforcement learning to achieve a more efficient noise reduction effect. This process ultimately produces denoised audio data.

Outputting denoised audio: Finally, the processed audio data is output. The data has undergone noise reduction processing by the DQN, resulting in a significant reduction in noise levels compared to the original input audio.

In summary, the audio data is first processed through a recurrent neural network for feature extraction, then extracted features are used in a DQN for noise reduction processing, ultimately resulting in the output of denoised audio. This method, which combines the recurrent neural network with the DQN, aims to effectively reduce noise in flight simulators and improve the quality of sound simulation.

Step 105: Perform inverse STFT on the processed spectral frames to obtain denoised audio.

Construction of a model and coefficient space exploration module: The model space exploration module of the algorithm in the present disclosure is an iterative search process, incorporated into the short-time Fourier audio noise reduction method of the present disclosure. It performs short-time Fourier processing on input audio files. Short-time Fourier noise reduction is a common audio noise reduction method based on STFT and spectral processing techniques. The basic idea of this method is to decompose an audio signal into temporally localized spectral information, then perform noise reduction processing on each spectral frame, and finally reassemble the processed spectral frames into a denoised audio signal through inverse transformation.

The mathematical definition of short-time Fourier analysis is as follows:

$$X_m(k) = \sum_{d=0}^{\Delta N-1} w(d)x(d+\mathrm{mH})e^{-je_k d}$$

$X_m(k)$ represents a complex spectrum of a given frame; x(n) represents a discrete sound signal; d represents a discrete time index; k represents a discrete frequency index; N represents a length of FFT; $e_k=2\pi k/N$ represents a discrete radian frequency; w(n) represents an analysis window function; m represents a frame number, equal to 0, 1, 2, . . . ; H represents a hop length or window advance length.

First, the input audio file undergoes STFT processing. This step involves decomposing the audio signal into a series of temporally localized spectral frames. This provides necessary spectral information for subsequent noise reduction processing.

Next, each spectral frame undergoes noise reduction processing independently. These steps may include noise estimation, noise removal, and signal enhancement for the spectral frames. Various noise reduction algorithms and techniques may be applied in these steps, such as Wiener filtering and spectral subtraction, as well as specialized recurrent neural networks and deep Q networks.

After the noise reduction processing is completed for all spectral frames, these processed spectral frames are reassembled into a continuous audio signal through inverse STFT. This step ensures the integrity and continuity of the audio signal in the time domain, resulting in a final denoised audio output.

In summary, the audio data is first decomposed into spectral frames through STFT, then these spectral frames undergo independent noise reduction processing, and finally, the processed spectral frames are reassembled into a denoised audio signal through inverse transformation. Throughout this process, the recurrent neural network and the deep Q network may play a role at various stages of the noise reduction processing to enhance the noise reduction effect.

During the short-time Fourier noise reduction process, the quality of noise reduction is determined by four important parameters: window function type, window length M, FFT length N, and hop length H.

The window function is used for framing the signal and mainly includes rectangular windows, Hanning windows, Hamming windows, etc. The choice of different window functions affects spectral resolution and spectral leakage. The rectangular window has good spectral resolution but can cause spectral leakage; the Hanning window can suppress spectral leakage but has relatively low spectral resolution. Depending on specific application needs, an appropriate window function is selected. In the present disclosure, the Kaiser window is selected, which is controlled by a parameter β. The larger the parameter β, the narrower the main lobe width of the window function, resulting in a stronger suppression capability. Based on the characteristics of the signal and noise reduction requirements, different β values can be tried, and the noise reduction effects can be evaluated to select an optimal β value. The model construction primarily focuses on coefficient space exploration for the window function.

The window length M refers to the number of sampling points in each framing window, which determines the time resolution of STFT analysis. A shorter window length can provide better time resolution but lower frequency resolution; a longer window length can provide better frequency resolution but lower time resolution. In selection of the window length, a balance between time resolution and frequency resolution needs to be struck. Typically, a window length that is a power of 2 can effectively improve the efficiency of FFT calculations. Different window length values can be tried, and the noise reduction effects can be evaluated to select an optimal window length value. The model construction primarily focuses on coefficient space exploration for the window function.

The hop length H refers to the number of sampling points between adjacent framing windows. A smaller hop length can provide better time resolution but increases computational complexity; a larger hop length can reduce computational complexity but decreases time resolution. The hop length is usually associated with the window length, and a certain overlap ratio, such as 50%, is typically selected. Depending on the change speed of the signal and computational resource limitations, an appropriate hop length can be selected. Different values can be tried, and the noise reduction effects can be evaluated to select an optimal hop length value. The model construction primarily focuses on coefficient space exploration for the window function.

The FFT length N determines the resolution of the spectrum. A larger FFT length can provide higher frequency resolution but also increases computational complexity. Typically, the FFT length that is a power of 2 can be selected to improve computational efficiency. The model construction primarily focuses on coefficient space exploration for the window function.

Figure 1:
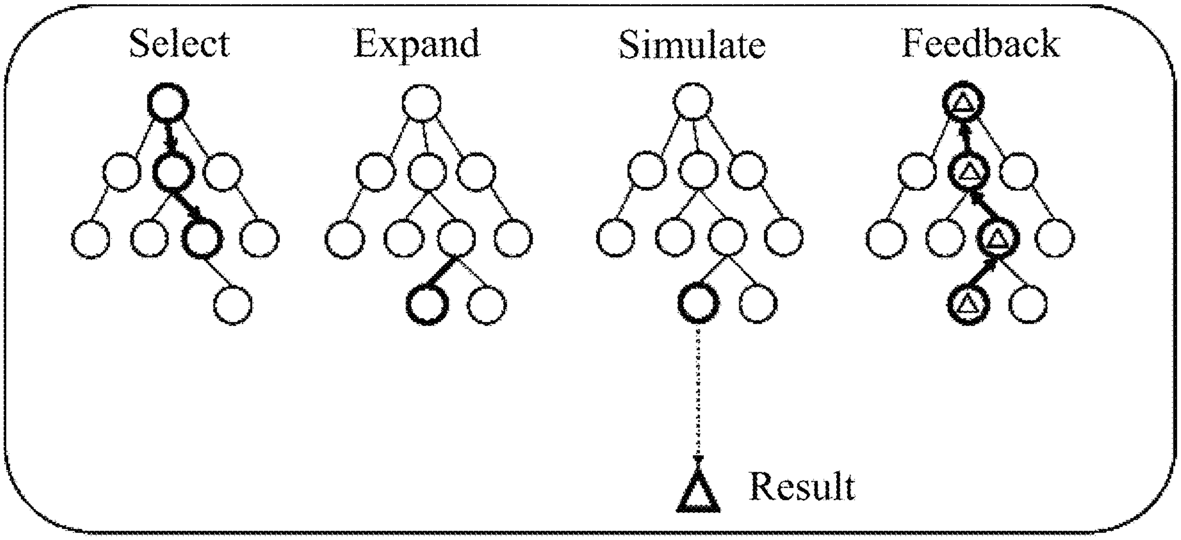
FIG. 1 illustrates a Monte Carlo tree search process.

The coefficient space exploration module of the algorithm in the present disclosure mainly focuses on the impact of four parameters during the STFT process. In the coefficient space, the Particle Swarm Optimization (PSO) algorithm is used to generate a set of the most suitable coefficients for each formula model. A fitness value is calculated based on the formula model and the corresponding coefficients. If the fitness value is less than a minimum historical fitness value, the formula generated by this formula model and the corresponding coefficients is considered the optimal formula. Each generation generates a formula path in the model space using a Monte Carlo Tree Search (MCTS) algorithm. During the generation of the formula path, an Upper Confidence Bound (UCB1) algorithm integrates the historical search information of the Monte Carlo tree, as shown in FIG. 1, and the action output information from the reinforcement learning training module. In addition, the Monte Carlo tree search has pruning operations to avoid redundant searches in the same area, thereby improving search efficiency and preventing getting stuck in local optima. The formula model refers to a model related to STFT parameters, while the optimal formula model refers to a model found by optimizing parameters through PSO.

Dataset training: First, a symbolic regression model is setup, consisting of operations such as add: addition, sub: subtraction, mul: multiplication, div: division, sqrt: square root, log: logarithm, abs: absolute value, neg: negation, inv: reciprocal, max: maximum, min: minimum, sin: sine (radians), cos: cosine (radians), tan: tangent (radians), and variables like x, y, as well as constants like π and e.

A total of 600,000 different formula models are randomly generated.

For each formula model, 20 sets of coefficients are randomly generated, with the coefficient range being [0, 1]. Each randomly generated formula model contains the 18 basic symbol types mentioned above, and each formula model can have up to 7 positions for basic symbols (non-leaf nodes) to choose from. The correct action selection corresponds to a label of 1, while other action selections correspond to a label of 0. Based on the above method, tens of thousands of training data are ultimately generated.

Model evaluation and deployment: The noise reduction effect of the model training is evaluated based on the signal-to-noise ratio, subjective scoring, and other methods. Once a desired noise reduction effect is achieved, a modified short-time spectrum is obtained, and then by performing the inverse STFT, the final audio file and spectrogram are reconstructed and added into the audio database. The model is continuously deployed and applied for further noise reduction tasks of the audio information.

In the audio noise reduction process, a coefficient fitting tuning algorithm of deep symbolic regression is combined with the short-time Fourier noise reduction method. This approach avoids the computational waste of directly using neural networks for black-box noise reduction and the difficulty of obtaining large datasets. On the other hand, it does not solely rely on the short-time Fourier noise reduction method, thus avoiding the time-consuming and labor-intensive process of manual listening for parameter tuning.

Compared with the prior art, the present disclosure has the following beneficial effects:

1. Noise reduction is achieved using short-time Fourier analysis, which involves decomposing an audio signal into temporally localized spectral information, then performing noise reduction processing on each spectral frame, and finally reassembling the processed spectral frames into a denoised audio signal through inverse transformation. By analyzing frequency domain information, the energy and distribution of noise can be accurately estimated, allowing for targeted noise suppression. This significantly reduces the impact of noise on the original audio, improving audio clarity and quality.

2. Adaptive parameter tuning is conducted based on machine learning algorithms of deep symbolic regression. In addition, based on the short-time Fourier method, a noisy audio signal is decomposed to obtain power spectral density, and spectral analysis is performed to reconstruct a new audio signal. By using factors such as signal-to-noise ratio for learning adjustments of the corresponding STFT parameters, it greatly reduces the time and effort spent on subjective listening for parameter tuning in existing technologies that only perform short-time Fourier noise reduction. It directly avoids the challenges of obtaining corresponding noisy and clean audio. Compared to traditional linear regression methods, the present disclosure provides more accurate predictive results, and has stronger adaptability and improved applicability, making it highly promotable across various industries with noise reduction needs. The present disclosure significantly reduces the training time and computational resources required for constructing traditional convolutional neural networks for deep learning noise reduction, truly achieving low-cost and efficient noise reduction.

3. Symbolic regression modeling, on one hand, frees itself from the dependence on prior knowledge of the model from a purely data-driven perspective, analyzing relationships between variables solely from the data perspective. On the other hand, models obtained through symbolic regression are analytical, allowing for the application of model-based control algorithms. Finally, the amount of data training required for symbolic regression is far less than that for machine learning, enabling the acquisition of accurate mathematical models in a shorter time.

The present disclosure further provides a system for noise reduction in aircraft simulator sounds, including an acquisition module configured to acquire sound data from an aircraft simulator sound system; a classification module configured to classify the sound data to obtain classified audio data; an STFT module configured to perform STFT processing on the classified audio data to obtain spectral frames; a noise reduction module configured to perform noise reduction processing on the spectral frames by using a neural network, to obtain processed spectral frames, where the neural network includes a recurrent neural network and a DQN; and an inverse STFT module configured to perform inverse STFT on the processed spectral frames to obtain denoised audio.

In an optional implementation, the classification module specifically includes: a classification unit configured to classify the sound data according to recording devices to obtain an initial classification result; a feature extraction unit configured to perform feature extraction on the initial classification result to obtain feature data; a standardization and normalization unit configured to standardize and normalize the feature data to obtain standard audio signals; and a principal component analysis unit configured to perform principal component analysis on the standard audio signals to obtain the classified audio data.

In an optional implementation, the noise reduction module specifically includes: a time series feature analysis unit configured to input the spectral frames into the recurrent neural network for time series feature analysis to obtain time series features of the audio data; and a noise reduction unit configured to input the time series features of the audio data into the DQN for noise reduction processing to obtain the processed spectral frames.

The present disclosure further provides an electronic device, including one or more processors; and a storage apparatus storing one or more programs, where when the one or more programs are executed by the one or more processors, the one or more processors are caused to implement the method.

The present disclosure further provides a computer storage medium, where the computer storage medium stores a computer program, and when the computer program is executed by a processor, the method is implemented.

The present disclosure proposes a noise reduction method based on STFT and frequency spectrum analysis, introducing machine learning algorithms of deep symbolic regression. This method addresses the issues of time-consuming and inefficient parameter tuning due to repeated listening by the human ear during short-time Fourier analysis, thereby achieving low-cost and easy noise reduction for audio signals.

The combination of recurrent neural networks with reinforcement learning, applied to short-time Fourier audio noise reduction, significantly reduces the time and effort spent on subjective listening for parameter tuning in existing technologies that only perform short-time Fourier noise reduction, and directly avoids the challenges of obtaining corresponding noisy and clean audio. By introducing relevant evaluation indicators, the present disclosure achieves adaptive parameter tuning by using reinforcement learning, and ensures that the denoised audio data reaches a fitting level by modifying parameters. Additionally, the model training that adjusts parameters through comparison of evaluation indicators greatly reduces the demand for training data, thus minimizing the possibility of overfitting. By changing the application scenarios for noise reduction, the applicability is correspondingly improved, making it highly promotable and applicable across various industries with noise reduction needs. It also significantly reduces the training time and computational resources required for constructing convolutional neural networks for deep learning, designing an end-to-end model with noisy signals as input and clean signals as output for hard threshold noise reduction, thereby greatly enhancing the noise reduction effect.

The present disclosure relates to the design field of flight simulator sound simulation systems that extract and denoise specific audio source signals from mixed sound sources, achieving low-cost and high-performance solutions that can be used across various models.

Specifically, short-time Fourier noise reduction is achieved by using STFT and spectral processing techniques. By employing the deep symbolic regression technology, the present disclosure eliminates the need for repeated listening by the human ear for parameter tuning. By comparing evaluation indicators such as signal-to-noise ratio, speech distortion, and channel distortion before and after noise reduction for the audio signal, corresponding algorithms are set. Model training is conducted based on recurrent neural networks and reinforcement learning methods to achieve adaptive parameter tuning, thereby determining ideal value ranges for parameters such as Kaiser window, window length, FFT length, and hop length during STFT, saving substantial costs. Corresponding filters are designed for filtering and noise reduction, facilitating the extraction of different types of sounds in flight simulators.

The sound signal analysis and processing methods used in the present disclosure can be easily updated and modified, and can be easily transported to other simulator systems such as cars, tanks, and trains.

Each embodiment in the description is described in a progressive mode, each embodiment focuses on differences from other embodiments, and references can be made to each other for the same and similar parts between embodiments. Since the system disclosed in an embodiment corresponds to the method disclosed in an embodiment, the description is relatively simple, and for related contents, references can be made to the description of the method.

Particular examples are used herein for illustration of principles and implementation modes of the present disclosure. The descriptions of the above embodiments are merely used for assisting in understanding the method of the present disclosure and its core ideas. In addition, those of ordinary skill in the art can make various modifications in terms of particular implementation modes and the scope of application in accordance with the ideas of the present disclosure. In conclusion, the content of the description shall not be construed as limitations to the present disclosure.

What is claimed is:

1. A system for noise reduction in aircraft simulator sounds, comprising:

an acquisition module configured to acquire sound data from an aircraft simulator sound system;

a classification module configured to classify the sound data to obtain classified audio data;

a Short-Time Fourier Transform (STFT) module configured to perform STFT processing on the classified audio data to obtain spectral frames;

a time series feature analysis unit configured to process the spectral frames by using a recurrent neural network, and extract time series features from an input noisy audio signal to capture time-dependence and dynamic changes in audio data, thereby obtaining the time series features of the audio data;

a noise reduction unit configured to input the time series features of the audio data into a deep Q-network, wherein the deep Q-network uses a deep symbolic regression algorithm to optimize processed spectral frames based on evaluation indicators comprising signal-to-noise ratio, speech distortion, and channel distortion by adaptively adjusting a window function type, a window length, a Fast Fourier Transform (FFT) length, and a hop length, thereby achieving efficient noise reduction; and an inverse STFT module configured to perform inverse STFT on the processed spectral frames to obtain denoised audio.

2. The system for noise reduction in aircraft simulator sounds according to claim 1, wherein the classification module specifically comprises:

a classification unit configured to classify the sound data according to recording devices to obtain an initial classification result;

a feature extraction unit configured to perform feature extraction on the initial classification result to obtain feature data;

a standardization and normalization unit configured to standardize and normalize the feature data to obtain standard audio signals; and a principal component analysis unit configured to perform principal component analysis on the standard audio signals to obtain the classified audio data.

* * * * *